(12) United States Patent
Sayer

(10) Patent No.: US 6,227,305 B1
(45) Date of Patent: May 8, 2001

(54) LOWER STEERING ARM ASSEMBLY FOR AN ATTACHING DEVICE OF A TRACTOR

(75) Inventor: John Sayer, Bridgnoth (GB)

(73) Assignee: GKN Walterscheid GmbH, Lohmar (DE)

(*) Notice: Subject to any disclaimer, the term of this patent is extended or adjusted under 35 U.S.C. 154(b) by 0 days.

(21) Appl. No.: 09/425,538

(22) Filed: Oct. 22, 1999

(30) Foreign Application Priority Data

Oct. 24, 1998 (DE) .............................................. 198 43 061

(51) Int. Cl.⁷ .............................. A01B 59/06; B60D 1/00
(52) U.S. Cl. ........................................ 172/439; 280/478.1
(58) Field of Search .................................... 172/272, 439; 280/455.1, 482, 478.1; 403/325, 330

(56) References Cited

U.S. PATENT DOCUMENTS 2,828,974   4/1958   Jameson .
3,437,355 * 4/1969   Jeffes ................................. 280/478
3,643,976   2/1972   Haupt et al. .
5,327,978 * 7/1994   Bremner ............................. 172/439

FOREIGN PATENT DOCUMENTS 0 608 750 A1   8/1994  (EP) .
  1598643      8/1970  (FR) .

* cited by examiner

*Primary Examiner*—Robert E. Pezzuto
(74) *Attorney, Agent, or Firm*—Harness, Dickey & Pierce, P.L.C.

(57) ABSTRACT

An assembly with a lower steering arm has a strut 1 and an attaching end 16. The attaching end 16 includes a base member 18 and a cover 19. A blocking pawl 34 is supported in the base member 18. The cover 19 is welded to the base member 18. The cover 19 includes a stop face 30 for the end face 10 of the strut 1. Thus, any tolerances in the region of the base member 18 provided in the form of a forging do not affect the position of the stop face 30. The latter can be aligned when connecting the base member 18 and the cover 19. Because of its setting contour, an actuating lever 43 can be used for both the right hand and the left hand lower steering arm.

13 Claims, 7 Drawing Sheets

LOWER STEERING ARM ASSEMBLY FOR AN ATTACHING DEVICE OF A TRACTOR

CROSS-REFERENCE TO RELATED APPLICATION

This application claims priority upon German application 198 49 061.5 filed Oct. 24, 1998, which is incorporated herein by reference.

BACKGROUND OF THE INVENTION

The invention relates to a lower steering arm assembly for an attaching device of a tractor.

EP 0 608 750 A1 describes a lower steering arm assembly for a three-point attaching device of a tractor. A forged strut, at one end, has a ball eye to be connected to a pivot pin at the rear of the tractor. The strut has a rectangular cross-section and is stepped. Near its free end, the strut is forged to be U-shaped. A cover is welded to the arms of the U-shaped portion forming a closed chamber. The forged web of the strut has a formed-in pocket. A blocking pawl is pivotably arranged around a pin connection in the pocket. The blocking pawl is spring loaded into the blocking position where it is pivoted out of the chamber. Two further pins are provided at a distance from the pivot pins. One of the pins is guided outwardly through an opening in one of the arms of the U-shaped portion. A knob is on the end of the pin to enable manual manipulation of the pawl. Thus, it is possible to move the blocking pawl, loaded by the spring, into a position which is withdrawn into the pocket. A stop face is provided at the end of the chamber of the forged strut. An insertable end is inserted into the chamber. The end has a substantially rectangular cross-section. A recess extends through the entire side face of its shank. The end has a supporting face for the locking face of the blocking pawl. The supporting face extends substantially transversely to the longitudinal axis of the insertable end. The end face of the insertable end comes to rest against the stop face of the chamber. At its end projecting from the chamber, the insertable end has a ball eye. The ball eye provides a connection with a corresponding attaching pin of the implement. After the blocking pawl has been retracted, the insertable end may at least be partially extracted from the chamber to facilitate the coupling operation. The setting recesses in the shank enable angular adjustment relative to the strut remaining at the tractor in order to facilitate the coupling operation. By reversing the tractor, the insertable end can be driven into the chamber. As this occurs, the blocking pawl, after the end face of the shank of the insertable end has stopped against the stop face of the chamber, drops into the recess in the side face of the shank.

The stop face at the end of the U-shaped recess of the strut must be machined to be able to observe the tolerances required for accurate locking. The stop face is adapted to the distance between the end face of the shank of the insertable end and the blocking face of the recess, and also to the locking face of the blocking pawl. In practice, close tolerances cannot be observed because subsequent machining, when the cover has already been associated with the U-shaped region, is not possible. This design makes it necessary for the entire strut to be forged, which, in turn, means high costs. Furthermore, since the blocking pawl is supported by a journal, a great deal of machining is required. Finally, the actuating knob has to be associated with different parts, depending on whether it is used for the left-hand or right-hand steering arm. In addition, due to the direction of the force acting on the actuating knob, remote actuation, by a cable operated from the tractor seat, is not possible.

SUMMARY OF THE INVENTION

It is an object of the present invention to provide a lower steering arm assembly that is cost-effective. The steering arm assembly also includes close tolerances relative to locking conditions between the strut and the attaching end.

In accordance with the invention, a lower steering arm assembly has a strut produced from a flat material. The strut has two narrow faces, two side faces, a first end to permit pivotable attachment to the tractor, and a second end. The second end has an attaching end which enables connection with the implement. The attaching end is removably secured to the second end by a locking mechanism. The locking mechanism, in the released condition, is movable relative to the second end of the strut. The locking mechanism enables a pivot movement in the extracted condition. The locking mechanism includes a recess in a side face of the strut towards the second end. The recess has a blocking face. A blocking pawl is associated with the attaching end. The blocking pawl engages the recess and is pivotably held in a pocket of the attaching end. The blocking pawl has a locking face cooperating with the blocking face. A spring loads the blocking pawl which operates the blocking face. The spring which loads the blocking pawl enables the pawl to assume the engaged position. An actuating means disengages the blocking pawl from the recess. The recess has a truncated cone-shape. The blocking pawl is pivotable around a pivot axis which intersects the longitudinal axis at a distance at a right angle. The pawl has a locking face adapted to the inner side face of the recess. The inner side face serves as the blocking face. The attaching end has two parts which are non-removably connected to one another. Together, the two parts form a chamber which is open on one side. The chamber receives the second end of the strut. A first part of the second end of the strut constitutes a base member which includes the pocket for receiving the blocking pawl and the mechanism connecting to an implement. The second part constitutes a cover. The second part has a stop face co-operating with an end face at the second end of the strut.

An advantage of this embodiment is that the strut does not have to be forged. Instead, it is possible to use a relatively cheap profiled material as a starting material. Furthermore, it is possible to observe relatively close tolerances without the need of a chip-forming machining operation. Accordingly, the cover includes the stop face. For tolerance reasons, the position of the stop face may be adjusted when connecting the cover to the base member. As at great distances from the point where the strut is articulated at the tractor, there is no need for any welding work to be carried out at the strut, there are no endangered portions. The attaching end, and especially the base member, is a relatively small and light part in comparison to the strut.

Thus, the base member can be produced cost-effectively as a forging. Also, the recess to receive a bearing ball can be forged in at the same time. Whereas, the base member is preferably forged, the cover is preferably hot-formed out of plate metal and welded to the base member. Setting recesses are provided to achieve a sufficiently large pivot movement of the attaching end in the extracted condition. The setting recesses open to the narrow faces of the strut. The recesses begin at a distance from the end face of the strut. The recesses extend over a certain length. The shape of the recess in the side face of the strut and the locking face of the blocking pawl are adapted to enable easy centering of the attaching end relative to the strut. Additionally, positive engagement of the blocking pawl and an advantageous distribution of loads is provided. Furthermore, by dividing the attaching end, the attaching may be easily adapted to struts with different thicknesses. Accordingly, only the cover needs to be modified. The expensive forging can be identical for all strut sizes.

According to a further embodiment of the invention, the blocking pawl has a supporting face at its end removed from the locking face. The supporting face, in its cross-section, is delimited by a circular arch. The circular arch is pivotably supported on a corresponding bearing face in the pocket. The spring is a leaf spring supported in the pocket. The blocking pawl is loaded by the spring such that the supporting face is held in contact with the bearing face. Accordingly, force is introduced advantageously from the blocking pawl into the base member of the attaching end. In addition, most of the chip-forming machining work becomes superfluous because there is no need for bores for pins which enable pivotal movement. For supporting purposes, a relatively large surface is available to minimize wear. Inclined faces are provided between the end face of the strut and the two narrow faces to facilitate the centering of the attaching end relative to the strut during coupling. The inclined faces also provide greater pivoting possibilities for the attaching end relative to the strut around an axis. The axis is positioned perpendicularly on the side face of the strut.

A stop pin crosses the chamber and a setting recess is secured to the base member and/or the cover. The stop pin and recess delimit the setting movement of the attaching end along the longitudinal axis relative to the strut.

The blocking pawl has rounded transition between the bottom of the recess and the inner side faces to facilitate engagement. The recess is rounded towards its bottom and otherwise has the shape of a truncated cone. The recess is easily produced in the side face of the strut. The recess is given its end dimension by chip-forming machining. The locking face of the blocking pawl is adapted to the recess. Alternatively, setting recesses are not provided in the strut, but setting pockets are provided in the base member and/or the cover towards the narrow faces to permit the pivot movement of the attaching end relative to the strut. Additionally, to increase the range of the pivot movement, it is possible to reduce the height of the strut towards its end face by providing a step.

From the following detailed description, taken in conjunction with the accompanying drawings and subjoined claims, other objects and advantages of the present invention will become apparent to those skilled in the art.

BRIEF DESCRIPTION OF THE DRAWINGS

Preferred embodiments of the invention are diagrammatically illustrated in the drawings and described in greater detail with reference thereto.

DETAILED DESCRIPTION OF THE PREFERRED EMBODIMENT

Figure 1:
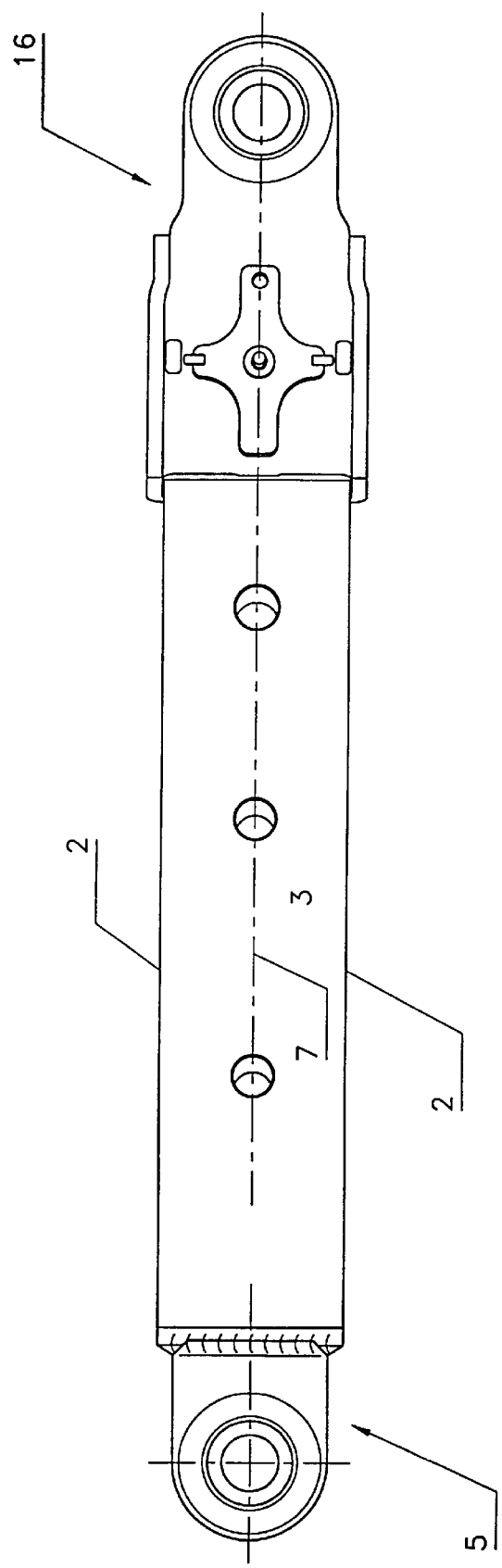
FIG. 1 is a side plan view of a first lower steering arm assembly in accordance with the invention.
Figure 2:
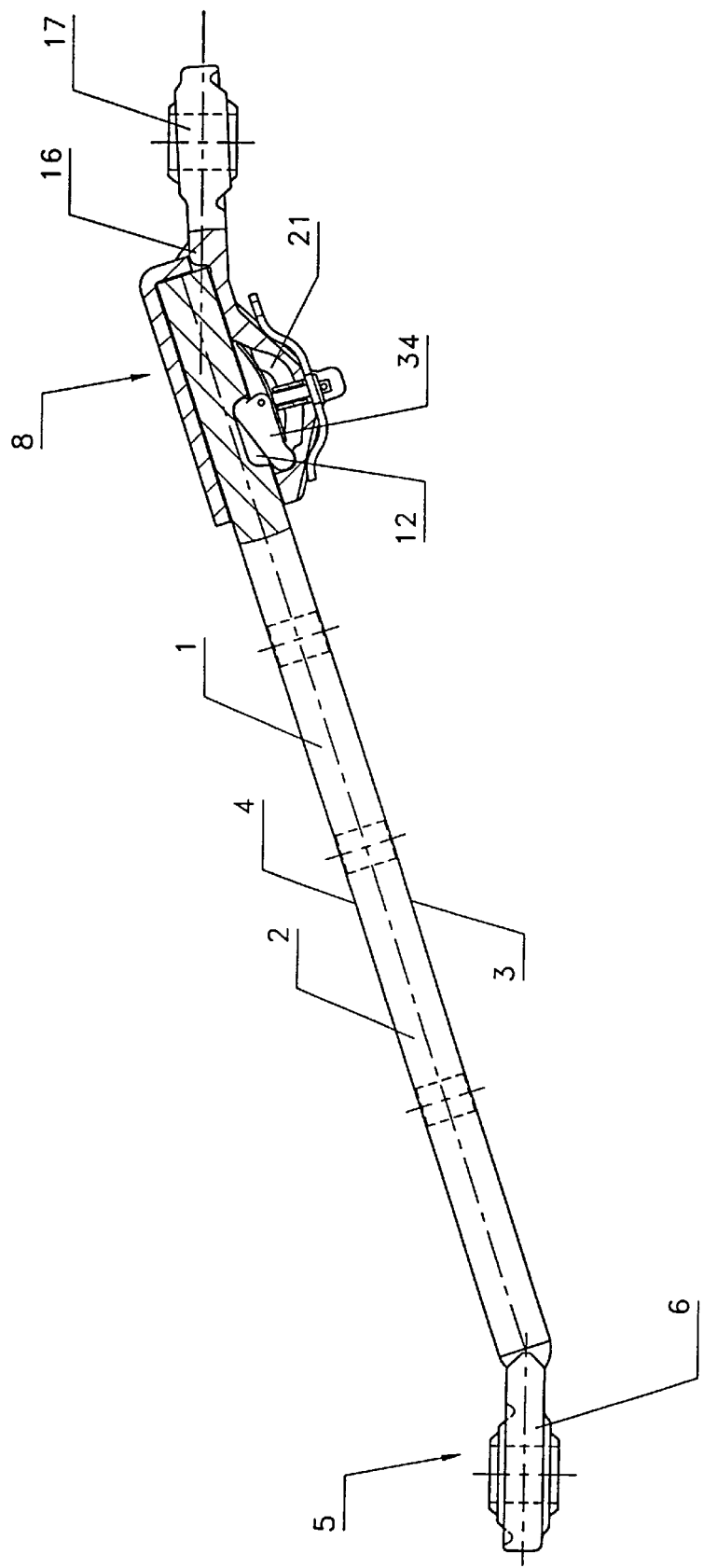
FIG. 2 is a plan view partially in section, and rotated ninety (90°) degrees, according to FIG. 1.

A first embodiment will be explained in greater detail with reference to FIGS. 1 to 6. The lower steering arm assembly includes a strut 1 which is produced from a flat material. The strut 1 has two narrow faces 2 and the two side faces 3, 4. A ball joint eye 6 is welded to the first end 5 of the strut 1. The ball joint eye is pivotably secured to the tractor or to a self-driving implement.

The strut 1 defines a longitudinal axis 7 and has a second end 8 remote from its first end 5. Towards the second end 8, setting recesses 9 are worked into the strut 1. The recesses 9 start from the narrow faces 2 and are positioned at a distance from the end face 10 at the second end 8. Narrow faces 2a are in the region between the end of the setting recesses 9 and the end face 10. The narrow faces 2a are stepped relative to the narrow faces 2. The height of the strut 1 in the region between the narrow faces 2 is greater than between the two narrow faces 2a.

Two inclined faces 11 start at the end face 10. The two inclined faces 11 end in the stepped narrow faces 2a and serve to center an attaching end 16. A recess 12 is worked into the side face 3 of the strut, at a distance from the end face 10. In the plan view, the recess 12 is circular. The recess 12 includes a longitudinal axis 12a. The recess 12 is in the form of a truncated, cone-shaped indentation. The inner face of the recess 12 forms the blocking face 13. The face 13 extends at an angle relative to the longitudinal axis 12a and ends with a curvature 14 in the bottom 15.

The connecting end 16, plugged onto to the second end 8 of the strut 1, also includes a ball joint eye 17. The eye 17 is connected to an implement to be attached or to be carried by the two lower steering arms arranged in parallel relative to one another at the tractor. The attaching end 16 includes two parts, a base member 18 and a cover 19. The base member 18 is provided in the form of a forging. A pocket 21 starts from a planar face 20 of the forging. The pocket is limited by an outwardly directed curvature. The pocket 21 is defined by a bearing face 22 which is delimited by part of the inner face of a cylinder having an axis 33. The pocket 21 provides support for a blocking pawl 34. The base member 18 has a bearing recess 23 which accommodates a bearing ball 24. The bearing ball 24 has a through-bore 25. The bore receives a receiving pin of the implement to be attached.

Figure 3:
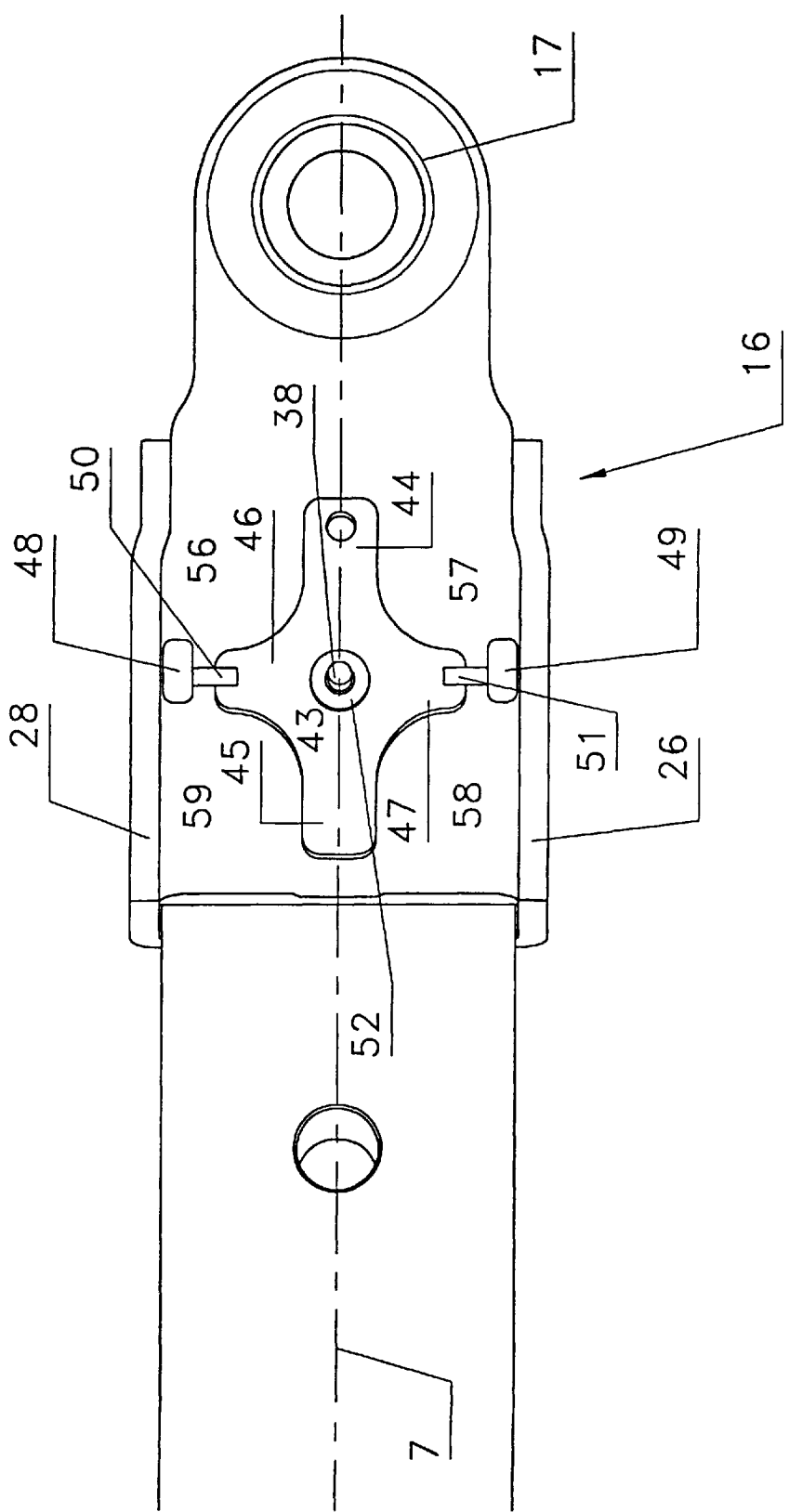
FIG. 3 is an enlarged plan view of the attaching end according to FIG. 1.
Figure 4:
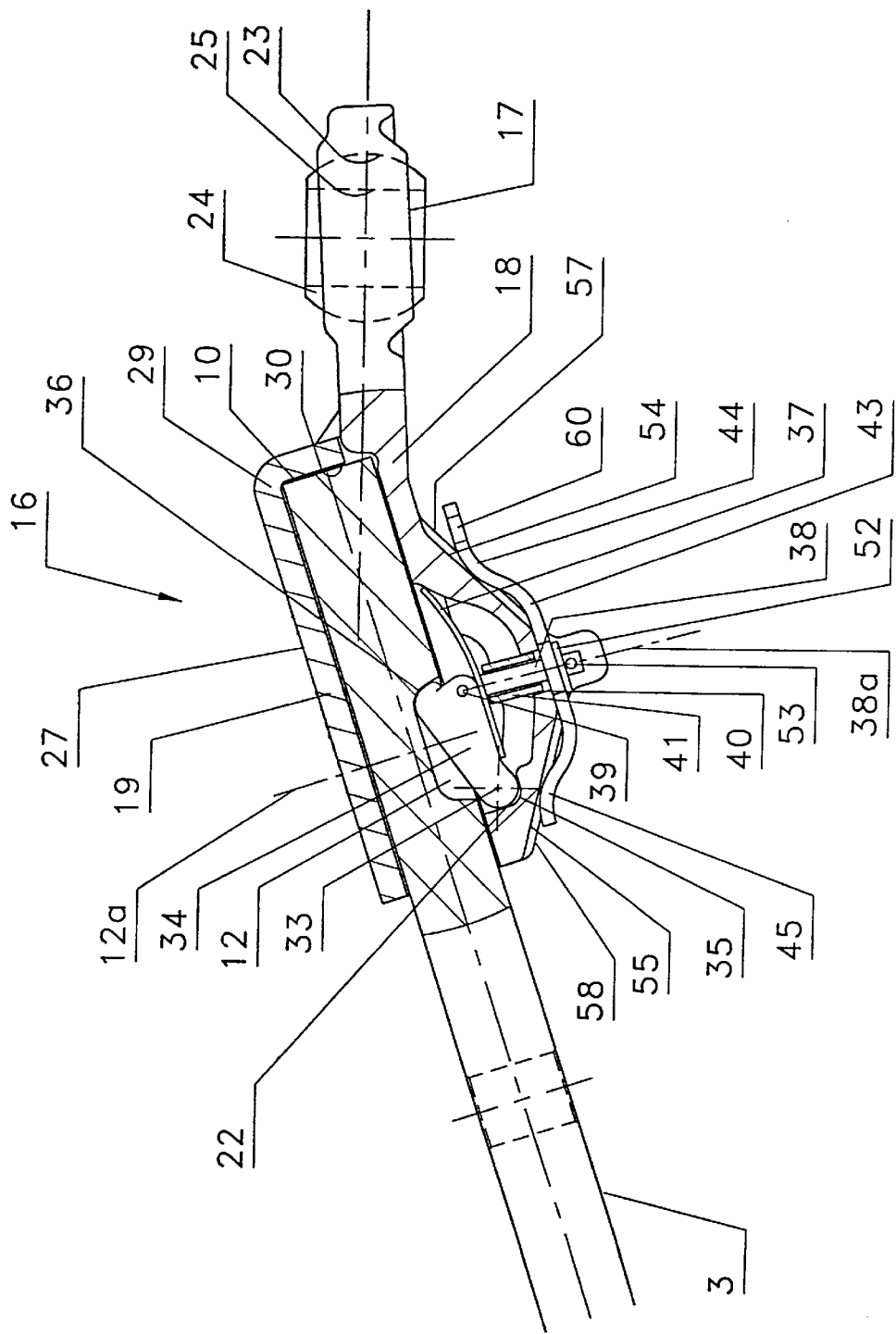
FIG. 4 is an enlarged section view of the selected region of FIG. 2.

The cover 19 has a U-shaped cross-section and the two arms 26, 28. The arms 26, 28 are connected to one another by a web 27. The arms 26, 28 receive the base member 18 between them and are welded thereto. Towards the ball joint eye 17, the cover 19 is provided with an end wall 29. The inside of the end wall 29 forms the stop face 30. An indentation 31 is provided in the area of transition between the inner face of the web 27 and the stop face 30. The planar face 20 of the base member 18, the inner faces of the two arms 26, 28 and of the web 27, as well as the stop face 30 of the end wall 29 of the cover 19, define a chamber 32. The second end 8 of the strut is received in the chamber 32. FIGS. 3 and 4 show the inserted condition. The attaching end 16 is fully plugged into the second end 8 of the strut 1. The end face 10 of the strut 1 is in contact with the stop face 30. The indentation 31 ensures that the end face 10 fully rests against the stop face 30. Thus, positive supporting conditions exist. In addition, the two faces 10, 30 are locked to one another by a blocking pawl 34.

The blocking pawl 34 has a supporting face 35. The supporting face 35 is adapted to the inner face, blocking face 13, and corresponds to the bearing face 22. Thus, the blocking pawl 34 is pivotable around the pivot axis 33 which forms the cylinder axis. It can be seen that the pivot axis 33 is arranged at a distance from the longitudinal axis 12a of the recess 12d and intersects same at a right angle.

At the end facing away from the supporting face 35, the blocking pawl 34 has a locking face 36. The locking face 36 is adapted to the shape of the inner face 13 forming the blocking face and to the curvature 14 of the recess 12. By selecting this shape, the pivot movement into the recess 12 is facilitated. FIG. 4 shows the engaged position. The blocking pawl 34, by its locking face 36, engages the recess 12. The blocking pawl 34 holds the attaching end 16 on the second end 8 of the strut 1. Thus, the strut 1 is able to apply tensile forces to the ball joint eye 17.

The cover 19 is in the form of a formed plate metal part or casting. The cover 19 may be produced more accurately than the forged base member 1. Thus, by associating the stop face 30 with the cover 19, it is possible, when producing the connection between the base member 18 and the cover 19, to compensate for any deviations. Compensation occurs by displacing the cover 19 relative to the base member 18. Thus, it is possible to transfer the exact distance measurements of the recess 12 relative to the end face 10. The end face is machined in a chip-forming way to the attaching end 16 to ensure that the blocking pawl 34 locks in as play-free a way as possible. The blocking pawl 34 includes a yoke-shaped portion. A tow bar 38 is received between the two yoke arms. The tow bar 38 is pivotably connected to the blocking pawl 34 by a transversely extending pin 39. The tow bar 38 is cylindrical and guided outwardly through a bore 40 in the wall of the base member 18. The bore 40 is in the region of the pocket 21, which receives the blocking pawl 34. A stop bushing 41 is positioned co-axially around the tow bar 38. The stop bushing 41 is displaceable by a limited amount. The stop bushing 41 projects inwardly into the pocket 21 onto the blocking pawl 34 in the locked condition of the blocking pawl 34. The bushing 34 is prevented from unintentionally pivoting into the unlocked position wherein the locking face 36 is disengaged from the recess 12. An actuating lever 43 is attached to the outside of the tow bar 38. A bore holds the actuating lever on the tow bar so as to be rotatable around the axis of rotation 38a. The axis of rotation 38a is defined by the longitudinal axis of the tow bar 38. Furthermore, the actuating lever 43 is secured on the tow bar 38 against axial displacement in at least one direction by a pin 53. A spring disc 52 is positioned between the pin 53 and the outer face of the actuating lever 43. The spring disc 52 suppresses any play, even in the locked condition, to prevent the actuating lever 43 from rattling. The stop bushing 41 is supported by its other end against the actuating lever 43.

The actuating lever 43 has four arms, two actuating arms 44, 45 and two securing arms 46, 47. Actuating arm 44 is provided with a bore 60 to enable the connection of towing means. The two securing arms 46, 47 are arranged at a right angle relative to the two actuating arms 44, 45. Thus, a kind of cruciform shape is obtained. In addition, the two actuating arms 44, 45 are crimped twice. Thus, the arms 44, 45 project towards the outer face of the base member 18 in the region of the curved pocket 21. The outer face of the base member 18 is provided with a setting contour in the region of the pocket 21. For the locked condition as illustrated in FIGS. 3 and 4, an indentation is provided with base 54, 55 to the right and to the left of the tow bar 38. The two actuating arms 44, 45 rest on the base 54, 55 in the locked condition as illustrated in FIGS. 3 and 4. The arms 44, 45 are aligned substantially in the direction of the longitudinal axis 7.

Figure 6:
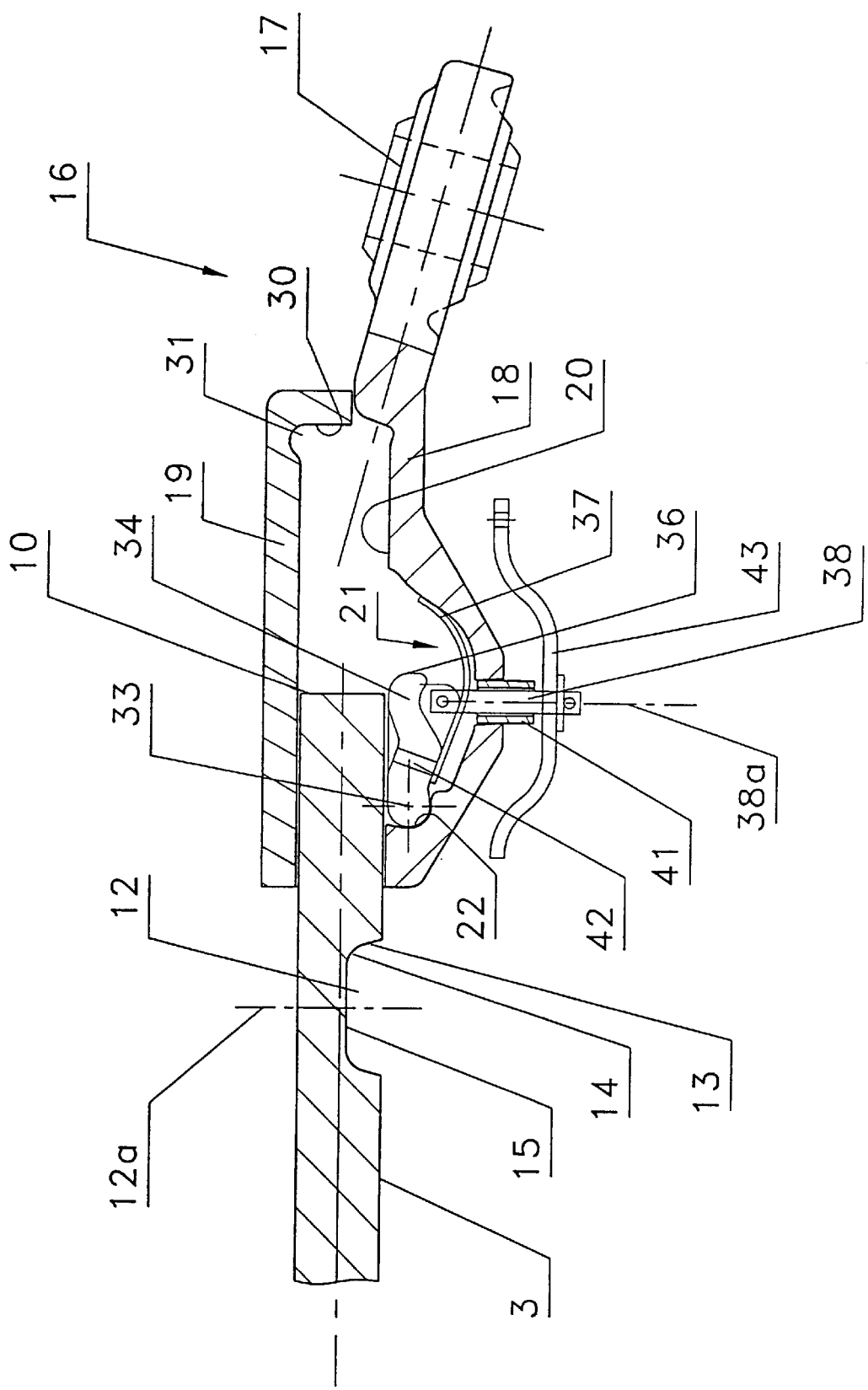
FIG. 6 is a section view like FIG. 4 of the attaching end relative to the strut in an extracted position.

Setting faces rise from the base 54, 55. Setting face 56 rises upwardly from the actuating arm 44. Setting face 59 rises upwardly from the actuating arm 45. Two rising setting faces 57, 58 are below the two actuating arms 44, 45. As the two actuating arms 44, 45 are crimped twice, they rest against the setting contour of the outside of the base member 18 in the region of the second crimping. The actuating lever 43 is pivoted counter-clockwise around the axis of rotation 38a of the tow bar 38 due to a towing element being acted upon. Via the bore 60, the lever 43 is articulated at the actuating arm 44. The actuating arm 44 moves from the base 54 upwards on the rising setting face 58 in order to achieve symmetric loading conditions. The second actuating arm 45 moves along the rising setting face 58 away from the base 55. This means that a tensile force is applied to the tow bar 38. The blocking pawl 34 is pivoted clockwise out of the recess 12 around the pivot axis 33 by its locking face 36, into a position as shown in FIG. 6. The stop bushing 41 also moves outwardly.

The blocking pawl 34 is additionally loaded towards its blocking position by a relatively strong leaf spring 31. The pawl 34 is loaded counter-clockwise. At one end, the spring 37 is supported on the inner contour of the pocket 21. The other end rests on the blocking pawl 34. The spring 37 is connected thereto by a holding pin 42 inserted into a bore of the blocking pawl 34. Furthermore, the spring 37 includes a slot through which the tow bar 38 is guided. Cams 48, 49 are on the outside of the base member 18, in the region of the pocket 21 to secure the blocking pawl 34 in the bolted position. The cams 48, 49 include projections in the form of securing pins 50, 51 projecting towards the tow bar 38. In the locked condition, the securing arms 46, 47 are positioned underneath the securing pins 50, 51. The stop bushing 41 is held in its inwardly displaced position because it is supported against the locked actuating lever 43 and cannot escape. The blocking pawl 34 is positioned in the recess 12. When pivoted out of its engagement relative to the recess 12, the blocking pawl 34 would stop against the stop bush 41. When a tensile force acts on the actuating lever 43, the tow bar 38 is not displaced and consequently neither is the blocking pawl 34. In addition, this measure ensures that the blocking pawl 34 is locked. This means that even when vibrations occur, the blocking pawl 34 cannot pivot around the pivot axis 33 because its outer face comes to rest against the end face of the stop bushing 41. The stop bushing 41 cannot escape outwardly.

Figure 5:
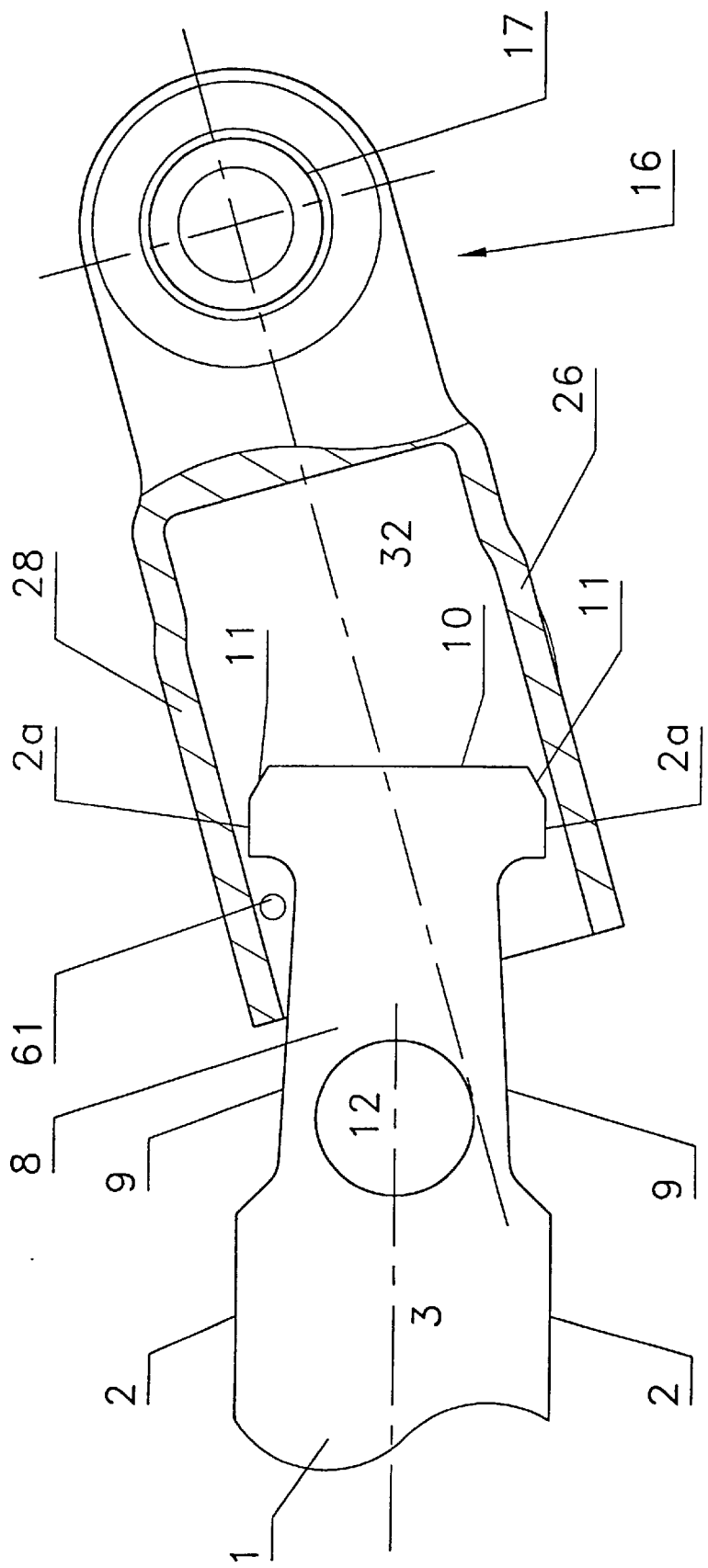
FIG. 5 is a partial cross-section view of the possible movements of the attaching end relative to the strut.

After the blocking mechanism has been released, after the blocking pawl 34 has been transferred into a position as shown in FIG. 6, the attaching end 16 can be pulled forward, away from the second end 8. FIG. 6 does not show the actual position of the actuating lever 43. Instead, for the sake of clarity, the actuating lever 43 is shown in a fully displaced, outward position. The lever 43 is out of contact with the outer face of the base member 18. FIG. 5, additionally, shows the attaching end 16 having been pivoted upwardly relative to the longitudinal axis 7 of the strut 1. The two stepped blocking faces 2a extend in the region of the chamber 32, while the inner faces of the struts 26, 28 approach one another and change by following a constant course.

The inclined faces 11 assist centering onto this region. The extraction path of the attaching end 16 relative to the second end 8 is delimited by the stop pin 61, which passes through the chamber 32. The stop pin 61 is positioned in the region of a setting recess 9. The setting recesses 9 enable the attaching end 16 to pivot, as illustrated in FIG. 5. In addition, slight adjustment movements are possible in the horizontal direction. The pivoting possibility facilitates coupling of the implement to the tractor if there is a difference in height between the strut 1 and the attaching pin of the implement. After the implement has been coupled, it is possible, by reversing the tractor, to move the strut 1, via its second end 8, into the chamber 32 until the end face 10 comes to rest against the stop face 30 of the cover 19. The blocking pawl 34 engages the recess 12 under the force of the spring 37. The resistance required for driving in the strut 1 is provided by the weight of the implement to be coupled.

Figure 7:
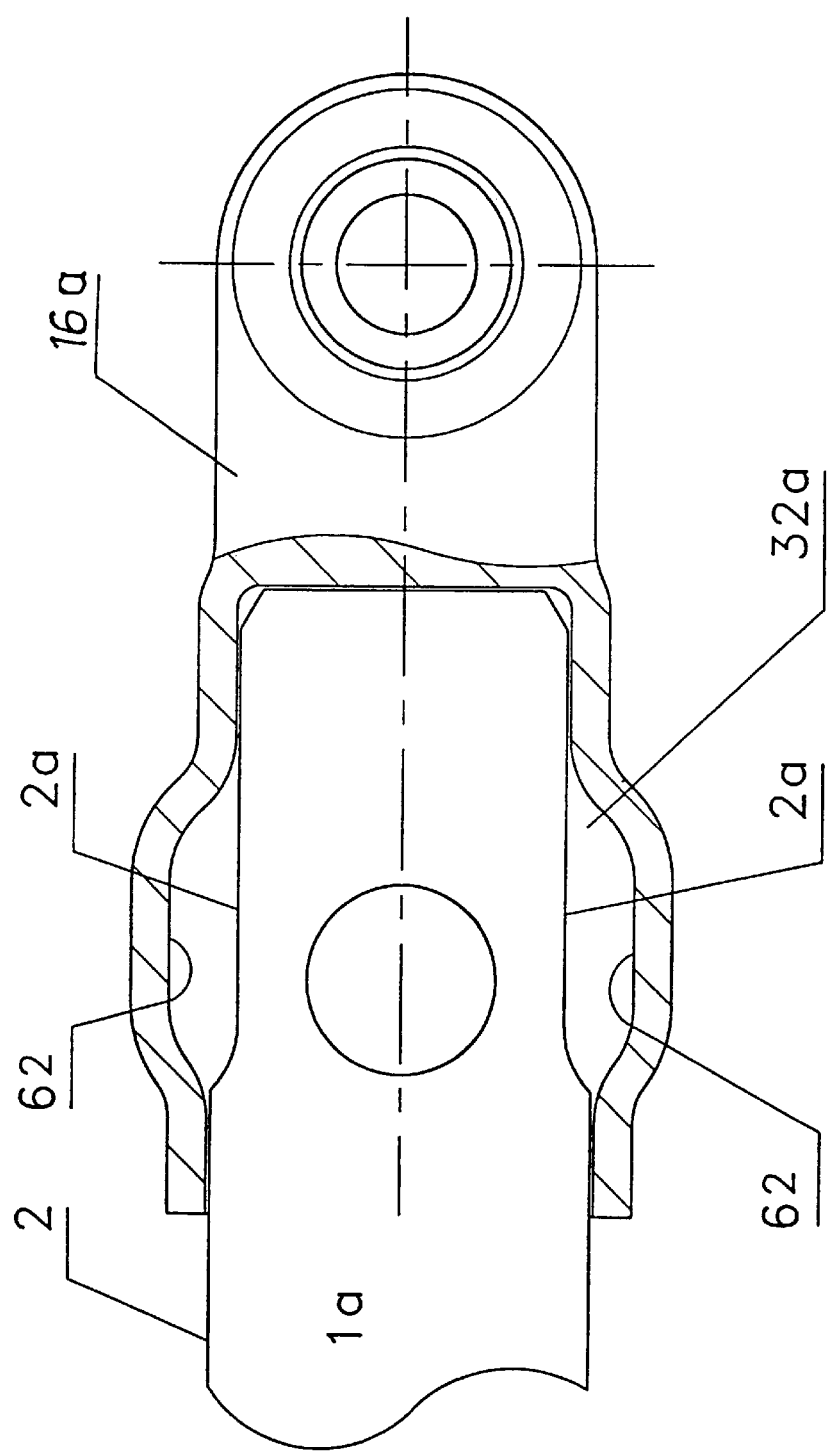
FIG. 7 is a section view through an alternative embodiment with a free space enabling vertical movement of the attaching end relative to the strut.

FIG. 7 shows a variant for the design of the second end of the strut 1*a* and of the attaching end 16*a*. To achieve vertical freedom of movement, a step is formed along a considerable part of the length of the second end of the strut 1*a*. In a first region, the two narrow faces 2 are guided by the arms at a greater distance from the end of the cover. Also, the faces 2 are parallel relative to one another in the chamber 32*a*. The two narrow faces 2 are followed by a region wherein the two narrow faces 2*a* are stepped. In this region, the arms are partly formed into setting pockets 62. Subsequently, the pockets are formed into a region where the stepped narrow faces 2*a* extend. The setting pockets 62 ensure the necessary freedom of movement of the attaching end 16*a* relative to the strut 1*a* in the extracted condition.

While the above detailed description describes the preferred embodiment of the present invention, the invention is susceptible to modification, variation and alteration without deviating from the scope and fair meaning of the subjoined claims.

What is claimed is:

1. A lower steering arm assembly for an attaching device of a tractor, comprising:

a strut formed from a flat material;

said strut having two narrow faces, two side faces, a first end enabling pivotable attachment to the tractor, and a second end;

an attaching end enabling connection with an implement, said attaching end is removably secured to the second end, in the released condition, said attaching end is movable relative to the second end of the strut and enables a pivot movement in the extracted condition, locking means including a recess in a side face of the strut towards the second end, said recess having a blocking face;

a blocking pawl associated with the attaching end, said blocking pawl engaging the recess and pivotably held in a pocket of the attaching end;

a locking face cooperating with the blocking face;

a spring loading the blocking pawl to enable the blocking pawl to assume the engaged position; and actuating means for disengaging said blocking pawl from the recess, the recess is truncated cone-shaped and the blocking pawl pivotable around a pivot axis intersecting the longitudinal axis at a distance at a right angle comprises a locking face adapted to the inner side face of the recess, said inner side face serves as the blocking face, said attaching end including two parts non-removably connected to one another forming a chamber which is open on one end for receiving the second end of the strut, a first part being a base member including said pocket for receiving the blocking pawl and the end for being connected to an implement and the second part being a cover which is provided with a stop face cooperating with an end face at the second end of the strut.

2. A lower steering arm assembly according to claim 1, wherein the base member is forged and includes a bearing recess accommodating a bearing ball being pivotable in all directions and including a through-bore.

3. A lower steering arm assembly according to claim 1, wherein the cover is formed of plate metal and is U-shaped including an end wall with the stop face and said cover is welded to the base member.

4. A lower steering arm assembly according to claim 1, wherein setting recesses open to the narrow faces of the strut and arranged at a distance from the end face of the strut.

5. A lower steering arm assembly according to claim 1, wherein at its end removed from the locking face the blocking pawl includes a supporting face which, in its cross-section, is delimited by a circular arch and which is pivotably supported on a corresponding bearing face in the pocket and said spring is a leaf spring supported in the pocket and loads said blocking pawl such that the supporting face is held in contact with the bearing face.

6. A lower steering arm assembly according to claim 1, wherein inclined faces are arranged between the end face of the strut and the narrow faces.

7. A lower steering arm assembly according to claim 1, wherein a stop pin crossing the chamber and a setting recess is secured to the base member.

8. A lower steering arm assembly according to claim 1, wherein a curvature is between the bottom of the recess and the inner side face forming the blocking face.

9. A lower steering arm assembly according to claim 1, wherein towards the narrow faces, the base member includes setting pockets.

10. A lower steering arm assembly according to claim 1, wherein towards the end face, the height of the strut is reduced by providing a step.

11. A lower steering arm assembly according to claim 2, wherein the cover is formed of plate metal and is U-shaped including an end wall with the stop face and said cover is welded to the base member.

12. A lower steering arm assembly according to claim 1, wherein a stop pin crossing the chamber and a setting recess is secured to the cover.

13. A lower steering arm assembly according to claim 1, wherein towards the narrow faces, the cover includes setting pockets.

* * * * *